United States Patent

Burreson

[11] Patent Number: 5,285,154
[45] Date of Patent: Feb. 8, 1994

[54] SATURABLE CORE PROXIMITY SENSOR ALIGNED PERPENDICULAR TO A MAGNET TARGET HAVING A PLATE AND A NON-MAGNETIC METAL HOUSING

[75] Inventor: Bernard J. Burreson, Seattle, Wash.

[73] Assignee: Eldec Corporation, Lynnwood, Wash.

[21] Appl. No.: 777,663

[22] Filed: Oct. 15, 1991

[51] Int. Cl.⁵ ............................................. G01B 7/14
[52] U.S. Cl. ........................... 324/207.16; 324/207.12; 324/207.26
[58] Field of Search ................. 324/207.16, 207.12, 324/207.22, 207.26, 225, 253; 335/205, 296, 301, 302, 304; 307/116; 336/110

[56] References Cited

U.S. PATENT DOCUMENTS

| | | | |
|---|---|---|---|
| 3,205,323 | 9/1965 | Deshautreaux, Jr. | 200/87 |
| 3,502,966 | 3/1970 | Perets et al. | 324/34 |
| 3,643,155 | 2/1972 | Riddle et al. | 324/254 |
| 3,750,068 | 7/1973 | Hallin | 324/207.22 |
| 3,956,693 | 5/1976 | Zutrauen et al. | 324/34 R |
| 4,117,401 | 9/1978 | Glauert | 324/208 |
| 4,140,971 | 2/1979 | Blincoe | 324/208 |
| 4,256,277 | 3/1981 | Embree | 244/213 |
| 4,556,859 | 12/1985 | Sheppard | 335/301 |
| 4,587,486 | 5/1986 | Soyck | 324/236 |
| 4,618,823 | 10/1986 | Dahlheimer et al. | 324/207 |
| 4,719,362 | 1/1988 | Nest et al. | 307/116 |
| 4,868,498 | 9/1989 | Lusinchi et al. | 324/173 |
| 4,924,180 | 5/1990 | Nasr et al. | 324/207.15 |
| 4,994,738 | 2/1991 | Soyck et al. | 320/207.13 |

Primary Examiner—Walter E. Snow
Attorney, Agent, or Firm—Christensen, O'Connor, Johnson & Kindness

[57] ABSTRACT

A variable reluctance saturable core proximity sensor assembly comprising a target and a sensor. The target consists of a magnet having a high field strength, a base plate having a high relative permeability, and a non-magnetic metal housing surrounding the magnet and base plate. The sensor consists of a core made from a material having a high relative permeability, a coil surrounding the core and a housing made from a non-magnetic material surrounding the core and coil. The sensor assembly may be used in either a slide-by or head-on mode. Depending upon the configuration of the sensor, the assembly may be used as either a proximity sensor or as a distance sensor.

17 Claims, 5 Drawing Sheets

SATURABLE CORE PROXIMITY SENSOR ALIGNED PERPENDICULAR TO A MAGNET TARGET HAVING A PLATE AND A NON-MAGNETIC METAL HOUSING

FIELD OF THE INVENTION

The present invention pertains to magnetic field-dependent proximity sensors and, more particularly, to saturable core magnetic field-dependent proximity sensors.

BACKGROUND OF THE INVENTION

Magnetic field-dependent proximity sensors are known, as illustrated in U.S. Pat. Nos. 4,719,362 to Nest et. al., 4,587,486 to Soyck, and 4,140,971 to Blincoe. Such proximity sensors typically include a magnet that functions as the target of the sensor, a core made from a material that will magnetically saturate when exposed to a field having a predetermined flux density, and an inductive element, e.g., a coil, surrounding the core. As the magnet is moved toward the core/inductive element assembly, a point is reached where the magnetic field of the magnet finds the core to be the smallest reluctance path. As a result, the flux of the field enters the core and eventually saturates the core, thereby causing the inductance of the inductive element to decrease. By measuring changes in inductance of the inductive element, the presence of the magnetic field, and hence, the presence of the magnet, may be detected.

Magnetic field-dependent proximity sensors are used in a wide range of applications for detecting when a first movable member is positioned in predetermined spaced relationship to a second member. For instance, such proximity sensors may be used to detect the position of devices used to actuate the flap panels in the wings of an aircraft, as disclosed in U.S. Pat. No. 4,256,277 to Embree. Although magnetic field-dependent proximity sensors used in aircraft typically function satisfactorily, their performance can be adversely affected when the aircraft is struck by lightening. More specifically, when lightening strikes an aircraft, peak current in excess of 200 Kamps can travel along the skin of the aircraft. These currents generate high frequency electromagnetic fields which may intercept the core and inductor, or the magnet of the target, of a magnetic field-dependent proximity sensor mounted to the aircraft. In some cases, the strength of such fields is sufficient to cause the core to saturate. As a result of this saturation, the inductance of the inductor may fall into a range indicating the magnet, and hence, the mechanical element attached thereto, has been moved to within a predetermined proximity of the core and inductive element assembly. Similar change in the detection range of the proximity sensor can occur if the electromagnetic fields demagnetize the magnet of the target. Such erroneous signal information from the proximity sensor can be particularly troublesome when the sensor is used to detect the presence or absence of a mechanical element affecting the safe operation of the aircraft.

In addition to the sensitivity of known proximity sensors to high frequency electromagnetic fields generated by lightening strikes, known sensors also have a tendency to provide spurious results when the sensor is subjected to electromagnetic interference ("EMI") generated by equipment such as electrical motors, wiring and the like positioned near the proximity sensor. Relatedly, known magnetic field-dependent proximity sensors are not typically designed to detect only that portion of a magnetic field having a predetermined direction component. That is, known magnetic field-dependent proximity sensors are not generally designed to detect the X component of a magnetic field having X, Y and Z directional components, while at the same time substantially not detecting the Y and Z components of the magnetic field. As a consequence of EMI and the inability of known proximity sensors to discriminate as to the directional component of a field it detects, the resolution and/or target distance to field strength ratio of such sensors may not be as good as is desired.

The actuation zone of known variable reluctance proximity sensors, i.e., the physical region in which the target material must be positioned to be detected by the sensor, is often undesirably small. As a consequence, the respective placement of the target and sensor on the two mechanical elements, the proximity of which is to be detected, is critical to obtain proper proximity detection information. If the sensor and target are positioned too close to one another due to improper installation, mechanical wear, tolerance buildup or other factors, the first mechanical element could contact the second mechanical element during normal operation before the presence thereof is detected. Alternatively, if the sensor and target are positioned too far apart due to the above-noted factors, the sensor will never indicate the first mechanical element is within a predetermined proximity of the second element. Such criticality in the relative placement of the sensor and magnet can add significantly to the cost of installing and maintaining the proximity sensor, and can potentially compromise the safe operation of the machine in which the proximity sensor is installed.

Another problem with known magnetic field-dependent proximity sensors is that accurate proximity information is obtained from such devices only in a relatively narrow temperature range. Because such proximity sensors are frequently used in an environment subjected to significant swings in temperature, e.g., in unheated portions of an aircraft, a strong need exists for a magnetic field-dependent proximity sensor that is highly temperature stable.

The weight to detection range ratio of known magnetic field-dependent proximity sensors is typically less than is desired. For instance, a known variable reluctance proximity sensor that is representative of the state of the art with respect to weight to detection range ratios, weighs 0.13 pounds and has a detection range of 0.1 inch, providing a weight-to-range ratio of 0.769. This relatively low weight-to-range ratio is especially problematic when the proximity sensor is designed to be used in spacecraft or other equipment where weight is critical.

SUMMARY OF THE INVENTION

The present invention is a saturable core proximity sensor comprising a sensor assembly and a target assembly. The sensor assembly includes a core made from a permeable material that will saturate when exposed to a magnetic field having a predetermined flux density. An inductor surrounds the core, the inductance of which is less than a predetermined value when the core is saturated and is greater than the predetermined value when the core is not saturated.

The target assembly comprises a base plate made from a material having a high relative permeability and flux saturation value. A high field strength magnet, e.g., a magnet made from samarium cobalt, is positioned on the high permeability plate. The magnet has a planar configuration and is magnetized so that the magnetic field thereof is centered about an axis extending perpendicular to the major plane of the magnet. The high permeability plate reduces the reluctance path surrounding the magnet by about 50%, thereby substantially eliminating that portion of the magnet's field extending in one direction away from the major plane of the magnet and increasing the field strength of that portion of the magnetic field extending in an opposite direction away from the major plane. A nonmagnetic metal housing surrounds and encloses the base and magnet. The housing is designed to function as a Faraday cage, i.e., it cancels electromagnetic fields generated by currents provided by a source external to the proximity sensor so that the electromagnetic fields substantially do not intercept the magnet of the target assembly.

As the target assembly is moved toward the sensor assembly, a point is reached where the magnetic field of the inductor (generated by the drive current of the sensor assembly) together with the magnetic field of the target assembly cause the core of the sensor assembly to saturate to a level such that the inductance of the inductor decreases to a predetermined value. This predetermined value indicates that the target assembly has been moved to within a predetermined proximity of the sensor assembly.

Due to its design and construction, the proximity sensor of the present invention is highly temperature stable. In one embodiment of the present invention, the distance between the sensor assembly and target assembly at which the sensor assembly first detected the presence of the target assembly differed less than about 4% over the temperature range of −60° C. to +120° C.

In addition to being highly temperature stable, the present invention has a weight to detection range ratio that is about five times better than that of known variable reluctance proximity sensors. As a consequence, the sensor is highly suitable for use in applications where weight is critical, e.g., in spacecraft.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

Figure 1:
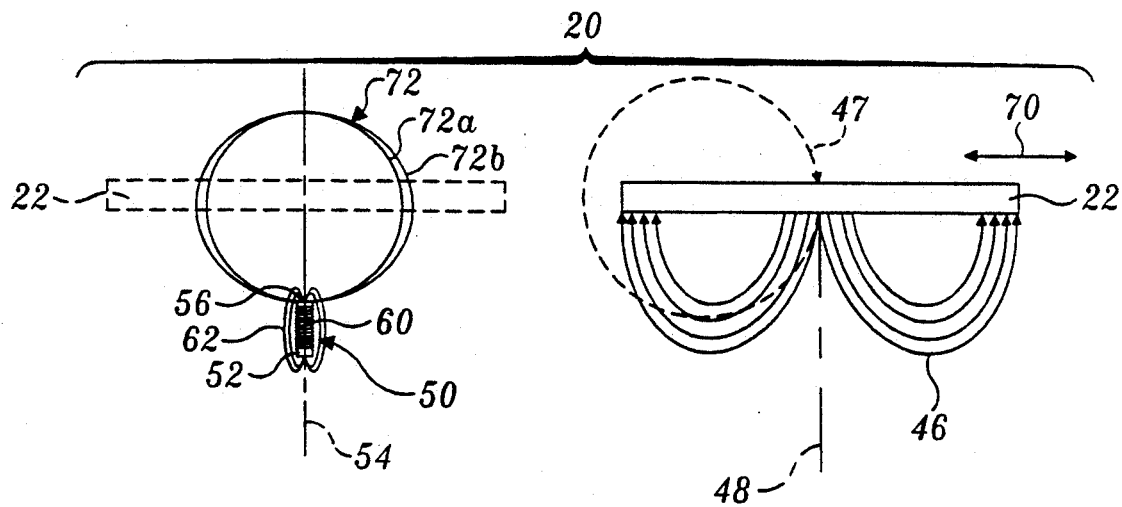
FIG. 1 is a side elevation view of the proximity sensor of the present invention, with the sensor and target being positioned for operation in the slide-by mode.

Referring to FIG. 1, the present invention is a saturable core proximity sensor assembly 20 comprising a target 22 and a sensor 50. Typically, either target 22 or sensor 50 is attached to a first object (not shown) that is mounted so as to be movable along a predefined path relative to a second object (not shown) to which the other of the target 22 or sensor 50 is attached. In some cases, the second object will also be mounted so as to move along a predetermined path. Depending upon the configuration employed, sensor assembly 20 may be used to detect the presence of the first object relative to the second object, or may be used to determine the distance between the first object and the second object within a given range, as discussed in greater detail hereinafter.

Figure 2:
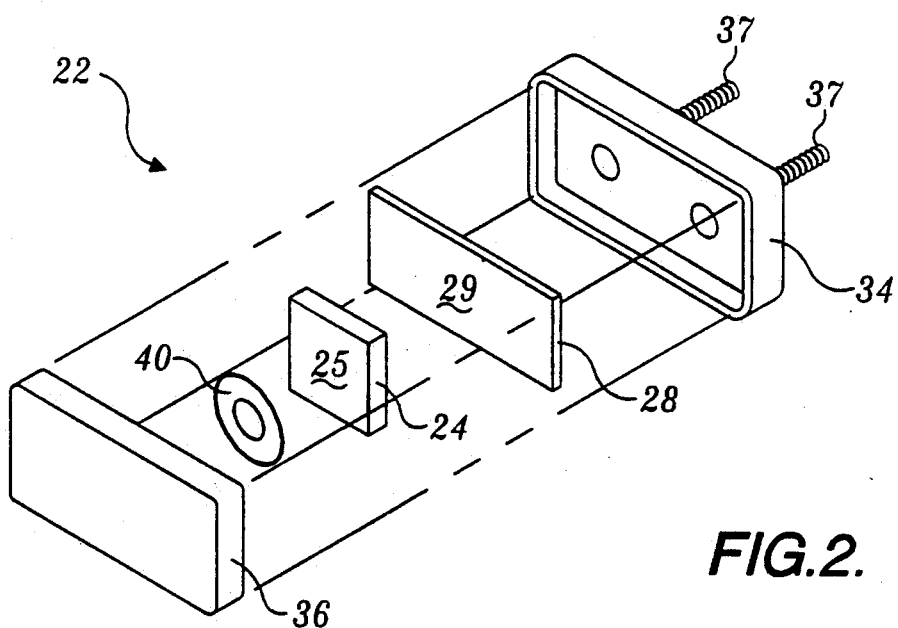
FIG. 2 is an exploded perspective view of the target of the proximity sensor.

Referring to FIG. 2, target 22 comprises a magnet 24. Ideally, magnet 24 has the highest $B_r$ (residual flux density) and $H_c$ (coercive force) values possible, which values will not degrade with the changes in temperature to be encountered by sensor assembly 20. Higher $B_r$ values provide a longer actuation range for sensor assembly 20, and higher $H_c$ values provide increased protection from demagnetizing fields. Both $B_r$ and $H_c$ determine the energy in the magnet. Unfortunately, commercially available magnets having sufficiently high $B_r$ and $H_c$ values and high stability of such values over a wide temperature range (e.g., −60° C. to +120° C.) are not believed to exist. Consequently, either high $B_r$ and $H_c$ values or high temperature stability must be sacrificed.

When high temperature stability of $B_r$ and $H_c$ values is desired, one family of magnetic materials that may be satisfactorily used for magnet 24 is composed of rare earth elements and cobalt, e.g., samarium cobalt. Preferably, magnet 24 made from such materials has a $B_r$ of at least about 8.000 Gauss, an $H_c$ (coercive force) of at least about 7,000 Oersteds, a reversible temperature coefficient of induction of about −0.09% per °C. in the range 25° C. to 100° C., and a Curie temperature of at least about 250° C. Ugimag Company distributes this type of magnet under the mark RECOMA ®.

Depending upon the intended application of sensor assembly 20, the specific values for the foregoing characteristics of magnet 24 may differ somewhat from those values indicated above. For instance, when sensor assembly is intended to be used in an environment subject to temperature swings of only about −55° C. to 70° C. the Curie temperature of magnet 24 may be lower, thereby permitting neodymium iron boron magnets to be used as magnet 24. An advantage of such magnets is their relatively high $B_r$ values (i.e., 11,000 Gauss). Ugimag Company distributes this type of magnet under the mark REFEMA ®.

Magnet 24 is magnetized so that its magnetic field extends in opposite directions away from its major plane (i.e., a plane extending parallel to top surface 25 of magnet 24) and is centered about, i.e., has a maximum X directed (i.e., perpendicular to the major plane) flux density adjacent, an axis intersecting the magnet so as to extend perpendicular to the major plane thereof. Additionally, the magnetic field distribution $B_x$ at a point X on the magnet central line (the axis intersecting the center of the magnet and extending perpendicular to the major plane of the magnet) varies based on the physical configuration of the magnet in accordance with the following formula:

Cylindrical configuration:

$$B_x(x) = \frac{B_r}{2}\left[\frac{L+X}{\sqrt{R^2 + (L+X)^2}} - \frac{X}{\sqrt{R^2 + X^2}}\right] \quad (1)$$

$B_r$ = residual flux density of magnet
L = length of magnet
R = radius of magnet
X = distance from surface of magnet along magnet central line (measured along axis extending coaxial with longitudinal axis of cylinder)

Square configuration:

$$B_x(X) = \frac{B_r}{\pi}\left[\tan^{-1}\left(\frac{AB}{2X\sqrt{4X^2 + A^2 + B^2}}\right) - \tan^{-1}\left(\frac{AB}{2(L+X)\sqrt{4(L+X)^2 + A^2 + B^2}}\right)\right] \quad (2)$$

$B_r$ = residual flux density of magnet
A = length of magnet
B = width of magnet
L = thickness of magnet (dimension extending parallel to magnet central line)
X = distance from surface of magnet along magnet central line Thus, as indicted by the foregoing equation, the size and configuration of magnet 24 is selected based on the distance between target 22 and sensor 50 at which the presence of the target is to be detected.

Target 22 further comprises a base plate 28 made from a material preferably having a relative permeability of at least about 20,000, i.e., 20,000 times the permeability of a vacuum. In addition, base plate 28 preferably has a flux saturation value of at least about 7,000 Gauss. A nickel-iron-molybdenum alloy of the type identified by the mark HyMu "80" ® manufactured by the Carpenter Steel Division of Carpenter Technology Corporation may be used in the construction of base plate 28. Preferably, the cross-sectional area of top surface 29 of base plate 28 is at least as great as the cross-sectional surface area of top surface 25 of magnet 24. In one embodiment of the present invention, surface 25 of magnet 24 measures 0.5 inch × 0.5 inch and surface 29 of base plate 28 measures 0.5 inch × 1.2 inch, with magnet 24 having a thickness of 0.125 inch and plate 28 having a thickness of 0.05 inch.

The relative permeability, flux saturation and thickness values for base plate 28 are relative, to some extent. Thus, if base plate 28 has a flux saturation value higher than 7,000 Gauss, its relative permeability may be less than 20,000. Similarly, if base plate 28 is thicker than 0.05", its relative permeability and flux saturation values may be decreased somewhat. Also, the relative permeability, flux saturation and thickness values of base plate 28 may have to be adjusted somewhat depending on the magnitude of the $B_r$ value for magnet 24. Such balancing of parameters will be governed by the intended use of sensor 20, and is believed to be well within the abilities of one of ordinary skill in the art.

Target 22 also comprises a two-part housing consisting of container 34 and cover 36. Container 34 includes four sides and a base and is open on top. The container is sized to receive magnet 24 and base plate 28. Cover 36 is designed to fit over container 34 so as to close off the open end of the container.

Figure 6:
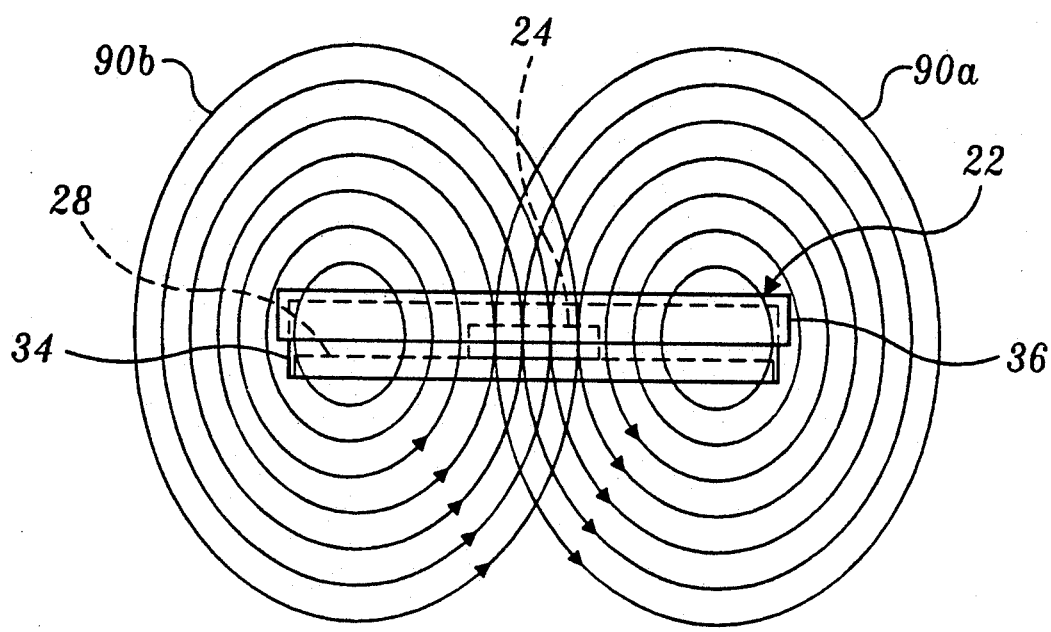
FIG. 6 is a side elevation view of the target, illustrating the manner in which electromagnetic fields from an external current source intercept the target.

To assemble target 22, base plate 28 is secured to the bottom of container 34 by suitable means, e.g., using an adhesive. Magnet 24 is then positioned on plate 28 so as to magnetically attract the plate and is then centered along the length of the plate. A suitable spacer 40 made from a nonmagnetic material is attached to the inside surface of cover 36 using an adhesive or other known means such that the spacer 40 is aligned with magnet 24 when cover 36 is positioned on top of container 34, as illustrated in FIG. 6. After cover 36 is so positioned, the cover is welded or otherwise secured to container 34. Container 34 and cover 36 are sized so that magnet 24 and base plate 28 are snugly captivated between the cover and the bottom surface of the container. Attachment means such as threaded studs 37, may be mounted to container 34 for use in securing target to an object, the proximity of which, relative to a second object is to be determined.

Referring to FIGS. 1 and 2, target 22 generates a magnetic field that may be represented by concentric flux lines 46 (FIG. 1). The flux lines 46 emanate outwardly away from magnet 24 and then curve around and enter the base plate 28 along the least reluctance path. The flux is then carried along the base plate until it reenters magnet 24. The flux density of the magnetic field provided by target 22 in the direction extending parallel to axis 48 is greatest adjacent the central axis, the latter extending perpendicular to the top surface of the target and intersecting the center of the magnet 24.

Ordinarily, the flux lines associated with the magnetic field of a magnet emanate outwardly and loop around the magnet and then reenter the magnet at a position opposite where the flux lines exited the magnet, as indicated by flux line 47 (FIG. 1). However, due to the high relative permeability of base plate 28, the latter provides a lower reluctance path than the region adjacent the back side of sensor 22, i.e., the area in space surrounding studs 37. In this regard, the permeability of base plate 28 should be selected so that the latter reduces at least 90% of the reluctance path on the back side of target 22. By appropriate sizing and selection of materials for magnet 24 and base plate 28, a reasonable goal is to reduce approximately 95-98% of the reluctance path on the back side of target 22. Thus, base plate 28 effectively prevents the emanation of a magnetic field from the back side of target 22.

In addition to preventing such emanation of the magnetic field, base plate 28 increases the strength of the magnetic field extending away from the front side of sensor assembly 20. Specifically, the magnetic field extends about 1.6 times as far away from the front surface of target 22, as measured along central axis 48, as it would without the presence of base plate 28.

Referring again to FIG. 1, sensor 50 comprises a core 52 made from a magnetically saturable material having a high relative permeability. When high temperature stability of sensor 20 is desired, core 52 should have the highest relative permeability possible. However, a relative permeability exceeding 20,000 has been found to be satisfactory. Lower permeability material, i.e., material having a relative permeability less than 20,000 may also be satisfactorily employed when some loss in temperature stability over a wide range can be accommodated. Core 52 may have a circular or rectangular cross-sectional configuration, as desired. The long dimension of core 52, i.e., the dimension extending along central axis 54, is significantly greater than the cross-sectional width or diameter of the core. The specific length and diameter of core 52 will vary depending upon the environment in which sensor assembly 20 is to be used and whether the sensor assembly is intended to function as a proximity detector or as a distance detector, as discussed in greater detail hereinafter. However, to optimize the temperature stability of sensor assembly 20 and minimize the measurement of side fields, core 52 preferably has a relatively small maximum cross-sectional dimension, e.g., 0.025 inch, and a length to diameter ratio of at least 5 to 1. In one embodiment of the invention, core 52 had a diameter of about 0.03 inch and a length of about 0.2 inch. Core 52 has a front end 56.

Sensor 50 also includes an inductive element 60 surrounding core 52. Inductive element 60 comprises a plurality of turns of relatively fine gauge wire, e.g., #37 copper wire, the ends of which are coupled with a circuit (not shown) for receiving the output of sensor assembly 20. As also discussed in greater detail hereinafter, the length of inductive element 60 will vary as a function of the environment and intended mode of operation of sensor assembly 20.

Figure 3:
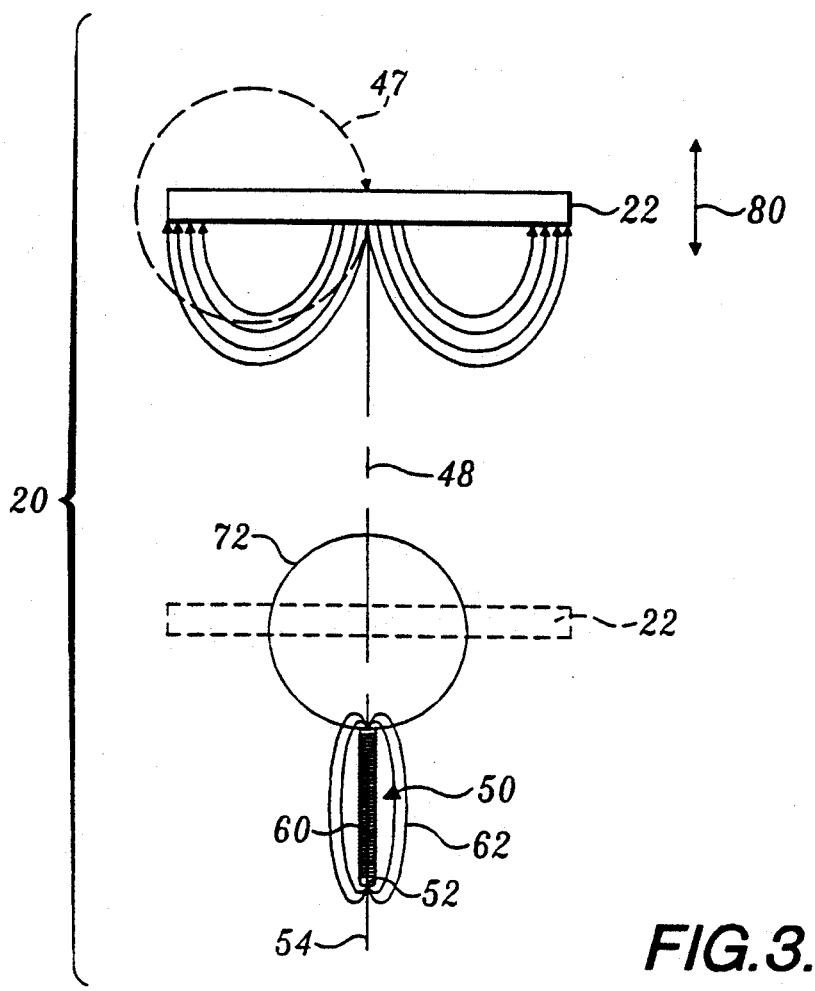
FIG. 3 is similar to FIG. 1, except that the sensor and target are positioned for operation in the head-on mode.

Inductive element 60 is coupled with the circuit (not shown) with which sensor assembly 20 is connected. The circuit provides an AC drive current to inductive element 60 that causes the element to produce a magnetic field identified by flux lines 62 (FIGS. 1 and 3). These flux lines travel through core 52, exit one end of the core, travel around the outside of sensor 50 and reenter the other end of the core. The strength of the magnetic field associated with inductive element 60 will vary as a function of the amplitude of the drive current. In turn, the strength of the magnetic field of inductive element 60 will affect when core 52 reaches saturation which determines the detection range of sensor assembly 20, as discussed in greater detail hereinafter. Thus, the specific characteristics of the drive current for sensor 50 are a design choice to be made by one of ordinary skill in the art based on the desired application and actuation range for sensor assembly 20. However, the AC drive current provided to sensor 50 will typically be on the order of 1–3 milliamps at 1 volt with a frequency in the range of 1000 to 2000 Hz. In any event, the drive current for inductive element 60 is insufficient to cause the element to generate a magnetic field of a strength sufficient to cause core 52 to saturate to the predetermined level indicating target 22 is positioned within a predetermined proximity of sensor 50, as discussed in greater detail hereinafter.

Sensor 50 preferably comprises a protective housing (not shown) surrounding core 52 and inductive element 60. This housing is made from a non-magnetic material, such as an appropriate type of stainless steel.

Sensor assembly 20 is designed to be operated in either the slide-by mode, as illustrated in FIG. 1, or the head-on mode, as indicated in FIG. 3. In the slide-by mode, target 22 is mounted to a first object (not shown) positioned adjacent a second object (not shown) to which sensor 50 is mounted. Relative movement occurs between the first and second objects along an axis or axes extending parallel to axis 70 (FIG. 1). Depending upon the environment in which proximity sensor 20 is designed to be used, the first object may be fixed and the second object designed to move parallel to axis 70. In other cases, the second object may be fixed and the first object designed to move parallel to axis 70. In a third case, both first and second objects are designed to move back and forth along axes extending parallel to axis 70.

As target 22 moves toward sensor 50, a point is reached where flux lines 46 begin to enter core 52 and follow it as the least reluctance path. As discussed in greater detail hereinafter, the physical dimensions and saturation value of core 52, together with the dimensions and configuration of inductive element 60, and the characteristics of the drive current provided to element 60, will determine when, after this point, the core reaches magnetic saturation. Whenever at least a portion of target 22 is positioned in the ball-shaped actuation zone 72 (FIG. 1), the magnetic field generated by target 52 together with the magnetic field provided by inductive element 60 will saturate the core to a predetermined value. More specifically, core 52 will saturate to a predetermined value when at least a portion of target 22 crosses over the actuation zone boundary 72a and will unsaturate such that its saturation value is less than the predetermined value when all of target 22 crosses over deactuation zone boundary 72b. The spacing between boundaries 72a and 72b is relatively small, i.e., less than about 0.020 inch. Actuation zone boundaries 72a and 72b are caused by hysteresis in the electronics (not shown) to which sensor assembly 20 is connected, such electronics not forming part of the present invention, and not by differences in the magnitude of the predetermined saturation value when target assembly 22 is moved toward sensor 50 versus when the target assembly is moved away from sensor 50.

Figure 4:
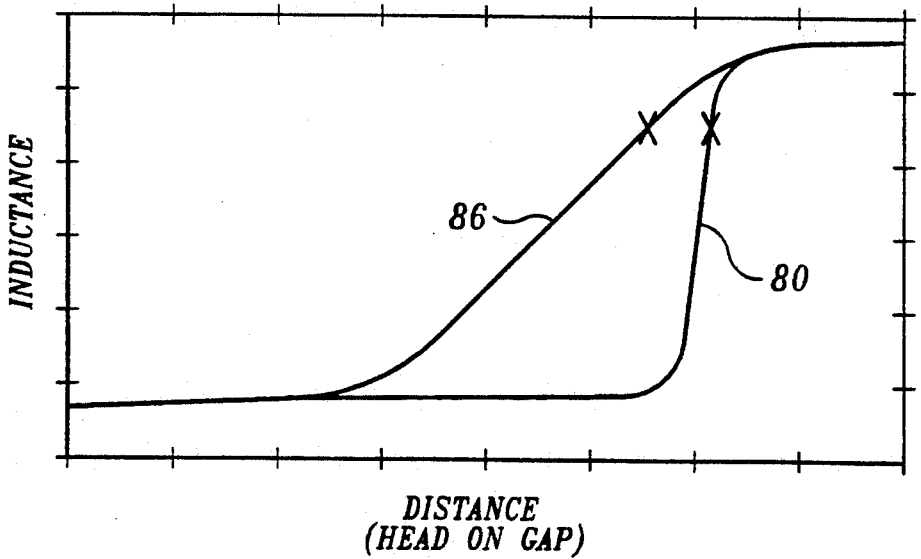
FIG. 4 graphically illustrates the manner in which the inductance of the inductor of the sensor changes with changes in distance between the sensor and target within a predetermined range for two different embodiments of the sensor of the present invention.

Referring to FIGS. 3 and 4, when core 52 saturates to the predetermined value, the inductance of inductive element 60 drops rapidly from a relatively high value representing virtually no saturation of the core to a relatively low value representing virtually complete saturation of the core. The "no saturation" inductance level is represented by the upper horizontal portions of inductance curves 80 and 86 in FIG. 4, and the "complete saturation" inductance level is represented by the lower horizontal portions of curves 80 and 86. The differences between inductance curves 80 and 86 will be discussed in greater detail below. Even at the "no saturation" inductance value, core 52 is slightly saturated as a consequence of the small field provided by inductance element 60. With the present invention, the magnitude of the inductance of element 60 when core 52 is not saturated is typically about 3–5 times the magnitude of the inductance of element 60 when core 52 is saturated.

As the inductance of inductive element 60 drops from the upper "no saturation" level to the lower "complete saturation" level, the inductance passes through a predetermined level identified by an "X" on curves 80 and 86 in FIG. 4. This predetermined inductance level indicates either (a) that target 22 has moved within a predetermined proximity of sensor 50, when the inductance of inductive element 60 decreases through the predetermined inductance level, or (b) that target 22 has moved outside of a predetermined proximity of sensor 50, when the inductance of inductive element 60 increases through the predetermined inductance level. The specific magnitude of the predetermined inductance value will differ depending upon the size of inductive element 60 and the position on the slope of the inductance curve selected as the predetermined inductance value. Preferably, the predetermined inductance value is about 80% of the "no saturation" inductance level, i.e., slightly below the upper knee of the inductance curve, as illustrated in FIG. 4. When target 22 is positioned within a predetermined proximity of sensor 50, it is also known that the first object to which the target is attached is positioned in predetermined proximity to the second object to which the sensor is attached, as measured along axis 70.

The rate at which the inductance of inductive element 60 drops from the upper value representing non-saturation of core 52 to the lower value representing saturation of core 52, relative to changes in distance between target 22 and sensor 50 will vary depending upon the size, configuration and permeability of core 52 and the size, configuration and drive current of inductive element 60. Typically, when sensor 20 is operated in the slide-by mode, it is desired that the inductance versus distance curve have a very steep function between saturation and nonsaturation points, e.g., as illustrated by inductance curve 80. To this end, sensor 20 is designed so that its entire length will rapidly saturate when exposed to a magnetic field having a predetermined flux density. That is, core 52 is relatively short (e.g., core 52 has a length to diameter ratio in the range 5 to 1–10 to 1) and has a high relative permeability (e.g., 20,000), with the length of inductive element 60 being about equal to that of core 52. With this configuration, sensor assembly 20 will function as an "on/off" proximity detector.

For certain slide-by application, it may be desirable to flatten out somewhat the inductance versus distance curve for sensor 50 so that the specific inductance of inductive element 60 may be equated with the spacing between target 22 and sensor 50. For instance, when sensor assembly 20 is attached to two movable objects, the spacing between which may vary over time, the change in spacing between the objects from a baseline distance may be determined by monitoring the absolute value of the inductance of inductive element 60. To achieve this flattening of the inductance versus distance curve, the length of core 52 and inductive element 60 are increased somewhat.

Actuation zone 72 extends outwardly from front end 56 along axis 54 a relatively large distance, as compared to known magnetic-field dependent variable reluctance proximity sensors. As a result of this configuration, when sensor assembly 20 is used in the slide-by mode, relatively wide latitude exists in the placement of target 22 on the first object and sensor 50 on the second object, as measured along axes extending parallel to central axis 54. That is, the spacing between target 22 and sensor 50, as measured along an axis extending parallel to central axis 54, may vary a relatively large amount, e.g., 0.25" in one embodiment of the present invention, while still ensuring target 22 will fall within actuation zone 72 when positioned adjacent to the front end 56 of sensor 50. On the other hand, known variable reluctance proximity sensors used in the slide-by mode typically can accommodate only a relatively small, e.g., 0.05", variation in spacing between target and sensor.

Sensor assembly 20 is also designed to be operated in the head-on mode, as indicated in FIG. 3. In this mode of operation, the first object to which the target 22 is attached and the second object to which the sensor 50 is attached are designed to move toward and away from one another such that central axis 48 of the target extends parallel to or coaxial with central axis 54 of the sensor, i.e., one or both of the first and second objects move along an axis or axes extending parallel to axis 80 in FIG. 3.

When sensor assembly 20 is set up to be operated in the head-on mode, the sensor assembly may be used to either detect when the first object to which target 22 is attached is within a predetermined proximity of the second object to which sensor 50 is attached or to detect the distance between the first and second objects, when such distance falls within a predetermined range.

Referring to FIGS. 3 and 4, when sensor assembly 20 is operated in the head-on mode for detecting when a first object is within a predetermined proximity of the second object, the core 52 and inductive element 60 of sensor 50 are preferably relatively short, i.e., the length of core 52 is on the order of five to ten times the diameter of the core, with the length of inductive element 60 being similar to the length of core 52. As discussed above in connection with the description of the operation of sensor assembly 20 in the slide-by mode, a ball-shaped actuation zone 72 extends outwardly from the front end 56 of the sensor. Thus, as the first object to which the target 22 is attached moves toward the second object to which the sensor 50 is attached, target 22 passes within actuation zone 72, thereby causing the core of the sensor to begin saturating and the inductance of the inductive element to begin decreasing. When sensor 50 is relatively short, the core will change from an unsaturated to a saturated state, and the inductance of inductive element 60 will change from a relatively high value to a relatively low value, as a result of only a relatively small amount of relative movement between the target and sensor, as illustrated by graph 80 in FIG. 4. As discussed above, when sensor 50 is relatively short, it functions substantially as an on-off proximity detector. Because the inductance versus distance curve for a relatively short sensor 50 has a very steep function in the transition region between saturation and unsaturation, sensor assembly 20 has a very good signal-to-noise ratio and a high immunity to EMI (electromagnetic interference).

Alternatively, when sensor assembly 20 is designed to be operated in the head-on mode as a distance detection or ranging device, a relatively long sensor 50 is provided, as illustrated in FIG. 3. That is, the length of sensor 50 is about 10 to 100 times the diameter of the sensor. As target 22 moves toward sensor 50 so as to enter actuation zone 72, the outermost end of core 52 saturates to the predetermined value, with the result that the inductance of inductive element 60 decreases somewhat. As target 22 moves closer to sensor 50, additional portions of core 52 saturate to the predetermined value, with the length of core 52 that is saturated to the predetermined value increasing linearly with decreases in distance between target 22 and sensor 50 as illustrated by graph 86 in FIG. 4. Because the inductance of inductive element 60 changes relatively slowly per unit of distance change between target 22 and the relatively long version of sensor 50 as sensor 50 changes from a completely unsaturated state to a completely saturated state, the distance between the first object to which the target is attached and the second object to which the sensor is attached may be readily determined, within a given range, as a linear function of the inductance of the inductive element. Thus, as those of ordinary skill in the art will readily appreciate, when sensor assembly 20 is designed to be used as a distance detection or ranging device, the length of sensor 50 is selected based on the physical range within which distance information is desired.

Due to the relatively low reversible temperature coefficient of induction of magnet 24 (e.g., about $-0.09\%/°C$. in the range 25° C. to 100° C.), the relatively large air gap associated with sensor 50, and the relatively small cross section of core 52, sensor assembly 20 is highly temperature stable. This characteristic of the present invention is highly advantageous when consistent proximity or distance detection information is required over a relatively wide temperature range (e.g., $-60°$ C. to 150° C.).

Figure 5:
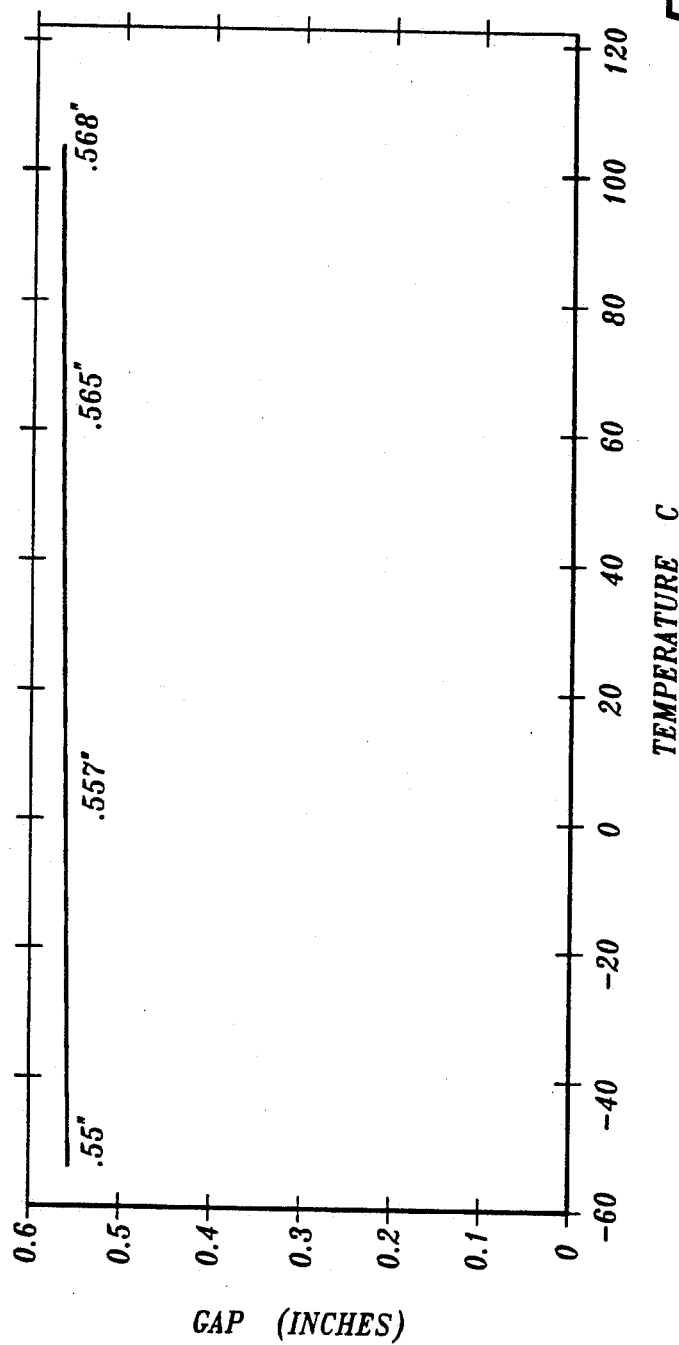
FIG. 5 illustrates graphically, for one embodiment of the present invention, over a given temperature range, the distance between the sensor and target at which the sensor first detects the target.

The high temperature stability of sensor assembly 20 is illustrated by the graph set forth in FIG. 5. In one embodiment of sensor assembly 20, when operated in the slide-by mode, the position at which the sensor 50 first detects the presence of target 22 differs less than 4% over the temperature range from about $-60°$ C. to about 120° C. In this embodiment, sensor 50 consists of a core 52 having a diameter of about 0.03 inch, a length of about 0.1 inch, and a relative permeability of about 20,000. Inductive element 60 consists of turns of copper wire wrapped around substantially the entire length of the core to a thickness such that the outside diameter of the inductive element is about 0.2 inch. The core and inductive element are encased in a cylindrical housing made from a nonmagnetic stainless steel and having a wall thickness of about 0.01 inch. Also in this embodiment of sensor assembly 20, magnet 24 measures about 0.5 inch $\times$ 0.5 inch $\times$ 0.125 inch, is made from samarium cobalt, has a residual induction $B_r$ of about 10,000 Gauss, a coercive force $H_c$ of about 10,000 Oersteds, a reversible temperature coefficient of induction of about $-0.09\%/°C$. (25° C. to 100° C.), and a Curie temperature of about 312° C. Base plate 28 measures about 0.5 inch $\times$ 1.2 inch $\times$ 0.05 inch and is made from a nickel alloy having a relative permeability of about 20,000 and a saturation value of about 7,000 Gauss. Container 34 and cover 36 are made from aluminum plate having a thickness of about 0.03 inch.

The inductance of the inductive element 60 of the embodiment of sensor assembly 20 described in the preceding paragraph also changes less than about 4% over the temperature range $-60°$ C. to 120° C. when target 22 is positioned in fixed relation to sensor 50 such that core 52 of the sensor is saturated by the magnetic field generated by target 22. For instance, with the embodiment of sensor assembly 20 described in the preceding paragraph, at 30° C. inductive element 60 had an inductance of about 2.1 millihenries at 2 KHz drive signal, such inductance varying less than about 2% over the temperature range $-60°$ C. to 120° C. for a total change of less than about 4%. Because the inductance of inductive element 60 constitutes the output signal of sensor assembly 20, such relatively minor changes in inductance demonstrate that highly consistent results may be obtained from sensor assembly 20 over a relatively wide temperature range.

The above-described embodiment of sensor assembly 20 has a detection distance to weight ratio of about 5 to 1. That is, sensor 50 will first detect the presence of target 22, when sensor assembly 20 is operated in the slide-by mode, when target 22 is moved to within about 0.5" of sensor 50, with the entire sensor assembly 20 weighing about 0.1 pounds. Similar detection distance to weight ratios are obtained when the above-described embodiment of sensor assembly 20 is operated in the slide-by mode. By selecting a magnet 24 that is larger than that used in the embodiment of sensor assembly 20 described above, or by using a magnet 24 having a residual induction, $B_r$, greater than 10,000, detection distance to weight ratios significantly in excess of 5 to 1 may be achieved with the present invention.

Sensor assembly 20 is designed to provide consistent, repeatable proximity or distance detection information even in the presence of relatively strong electromagnetic fields generated by current from a source external to the sensor assembly. For instance, when sensor assembly 20 is installed in an aircraft, the latter may be subjected to lightening strikes having a peak current of 200 Kamps or more. This current, which sheets along the outer skin of the aircraft, generates electromagnetic fields having an intensity of 10,000 amps/M or more, which fields may intercept sensor assembly 20 when positioned adjacent the outer skin of the aircraft. Such fields could temporarily adversely affect the operation of sensor assembly 20 by saturating core 52 of sensor 50, thereby causing the inductance of inductive element 60 to decrease to a level indicative of target 22 being positioned within a predetermined proximity of sensor 50. Additionally, electromagnetic fields associated with a lightening strike or other large current source could permanently affect the operation of proximity sensor 20 by demagnetizing magnet 24 of target 22.

To avoid such temporary or permanent effects of lightening strikes or other external sources of current, housing container 34 and cover 36 are provided. As noted above, container 34 and cover 36 are made from a nonmagnetic metal having a fairly high conductivity, i.e., a conductivity equal to at least half the conductivity of copper. It is preferred that aluminum be used in the construction of container 34 and cover 36 because it is relatively noncorrosive. However, other materials having a conductivity equal to or greater than that of aluminum, e.g., copper, may also be satisfactorily employed, particularly where corrosion will not occur or can be accommodated.

Figure 7:
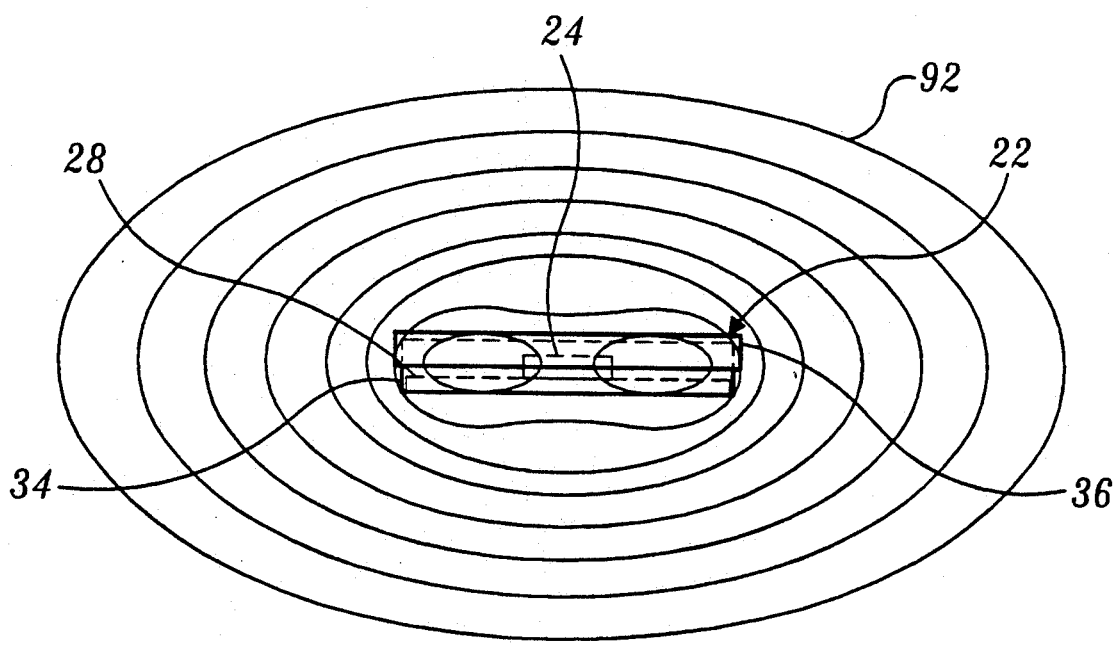
FIG. 7 is similar to FIG. 6, except that it illustrates the manner in which the housing of the target cancels such electromagnetic fields.

When container 34 and cover 36 are assembled as illustrated in FIGS. 1 and 3 so as to retain magnet 24 and base plate 28 therein, the container and cover function as a Faraday cage. In this regard, electromagnetic fields generated by current from a source external to sensor assembly 20 which extend so as to intercept target 22 assume a pattern represented by flux lines 90a 90b in FIG. 6. Flux lines 90a extend in a first direction along concentric substantially circular paths centered about a point adjacent one end of target 22, and flux lines 90b extend in an opposite direction in concentric substantially circular paths centered about a second point positioned adjacent an opposite end of target 22 and overlapping the paths of flux lines 90a. Because the flux lines 90a and 90b extend in opposite directions along overlapping paths through magnet 24, that portion of the magnetic field represented by the flux lines extending through magnet 24 is substantially cancelled, thereby producing a resultant field as represented by flux lines 92 in FIG. 7. As these flux lines 92 indicate, at most only the outer edges of magnet 24 are intercepted by relatively weak electromagnetic fields.

The effect of a relatively strong lightening strike on the embodiment of sensor assembly 20 described above in connection with the discussion of FIG. 5 was investigated. It was assumed that the wave shape of the lightening current was a double decaying exponential with a 200 Kamp peak at 6.4 microseconds and a 50% decay at 69 microseconds. It was assumed also that the proximity sensor was mounted adjacent the outer surface of a wing of an aircraft which was subjected to a lightening strike having the characteristics described above. In view of the manner in which container 34 and housing 36 cancel electromagnetic fields generated by a current from an external source, as described above, it was calculated that the intensity, H, of such fields at the upper surface 25 of magnet 24 was about 45 Oersteds. By way of contrast, it was calculated that a field having an intensity of 13,500 Oersteds would be required to demagnetize magnet 24. Thus, the operation of sensor assembly 20 is virtually unaffected by electromagnetic fields generated by currents from an external source having a magnitude on the order of that which might be encountered in connection with a relatively large magnitude lightening strike.

Container 34 and cover 36 also provide physical protection for magnet 24 and plate 28. In addition, container 34, with its mounting studs 37, provides a convenient way of securing target 22 to an object.

An important characteristic of sensor assembly 20, particularly when sensor 50 is relatively long proportionate to its diameter, i.e., a length to diameter ratio of more than 5 to 1, is that sensor assembly 20 substantially will not detect side fields extending transversely to central axis 54 of sensor 50. Such side fields typically consist of electromagnetic interference (EMI) generated by electrical equipment positioned adjacent sensor assembly 20 and by other known factors.

Figure 8:
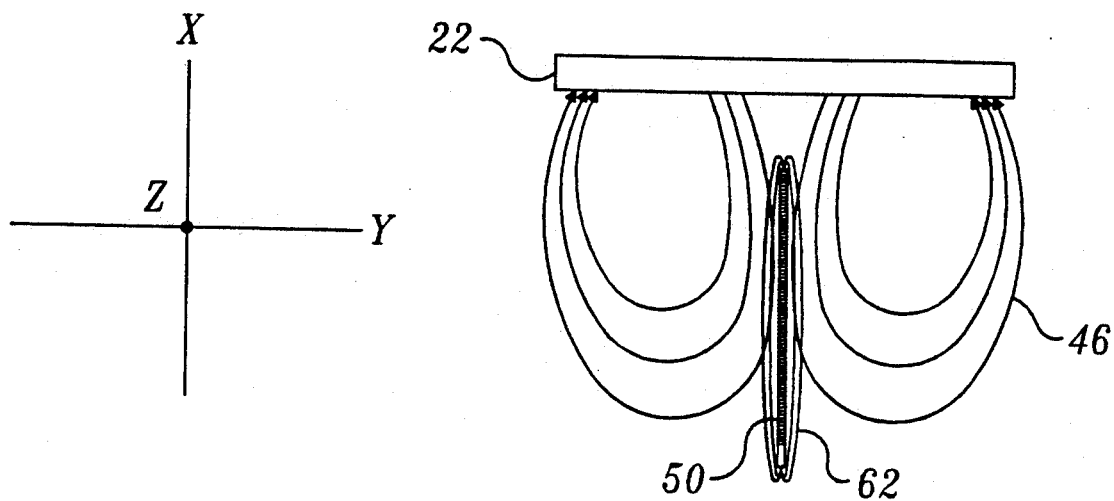
FIG. 8 is similar to FIG. 3, except that the target has been moved closer to the sensor, and the magnetic fields of the inductor of the sensor are illustrated.

As illustrated in FIG. 8, flux lines 46 associated with the magnetic field generated by target 22 consist of direction components extending along the X, Y, and Z axes. However, because the long dimension of core 52 extends parallel to the X directional components, as defined by the coordinate axis illustrated in FIG. 8, the core provides a least reluctance path substantially only for the X directional components, and hence only the latter will enter core 52 and cause the latter to saturate. The Y and Z directional components will find the reluctance path provided by core 52 to be sufficiently high as to substantially prevent the Y and Z components from entering and affecting the saturation of the core. Thus, as target 22 is moved toward sensor 50, in either the slide-by or head-on mode, a point is reached where the X directional components enter core 52, cause the latter to saturate to the predetermined value (together with the field provided by inductive element 60), and thereby cause the inductance of inductive element 60 to drop to a level indicating the target is positioned within predetermined proximity of the sensor. In this regard, it is to be appreciated that the magnetic field 62 associated with inductive element 60 consists principally of X directional components, i.e., directional components extending along the length of the core. However, the flux density of field 62 is insufficient to cause core 52 to saturate to the predetermined value.

Thus, side or cross fields generated by EMI or other sources have little, if any, affect on the ability of sensor 50 to accurately and consistently detect the proximity or spacing of target 22. Additional protection from the effects of EMI and other fields approaching from the back side of target 22 is achieved as a consequence of the use of base plate 28. As discussed above, as a consequence of the high relative permeability of base plate 28, the latter effectively functions as a shield to magnetic fields.

When determining the size and configuration of sensor 50, consideration needs to be given to the electronic environment in which sensor assembly 20 is to be used. Because the change in inductance of inductive element 60 as a consequence of core 52 switching between the saturated and unsaturated states can be relatively large, e.g., greater than five to one, sensor 50 should be sized so that the change of inductance falls within a range that can be accommodated by the electronic environment in which sensor assembly 20 is installed. For instance, in the BITE (built-in test equipment) environment of commercial aircraft, an inductive LRU (line replaceable unit) might have an acceptable range of 4.2 mh to 10 mh, with inductances falling outside of this range being considered a fault in the LRU. Thus, if sensor assembly 20 is designed so that the inductance of inductive element 60 has a range of 3 mh to 15 mh, the BITE system would consider the operation of proximity sensor 20 to be constantly in fault.

Figure 9:
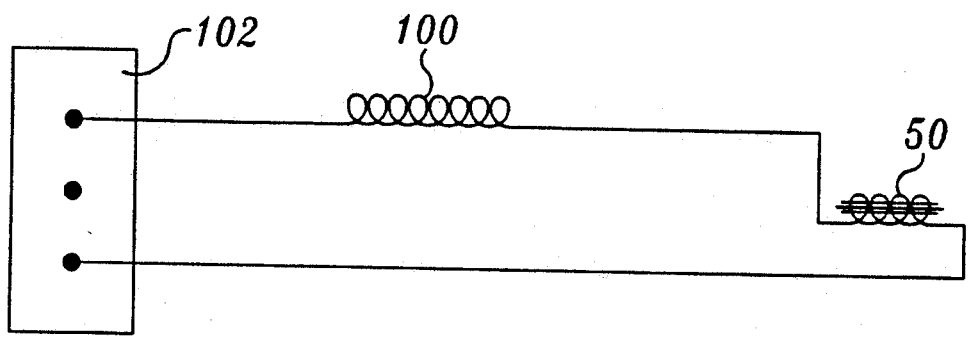
FIG. 9 is a diagram of a circuit incorporating the proximity sensor.

Referring to FIG. 9, to avoid this problem, sensor 50 is sized and configured so that its inductance varies over a relatively small range, e.g., 0.5 mh to 2.5 mh. By connecting sensor 50 in series with an inductive element 100 to the electronic circuit 102 with which the proximity sensor is designed to be used, and by appropriate selection of inductive element 100, the output of the circuit consisting of sensor 50 and inductive element 100 may be designed to fall within the prescribed range of the BITE system. For instance, for a BITE system having a prescribed range of 4.2 mh to 10 mh, sensor assembly 20 is designed so that the inductance of inductive element 60 ranges between 0.5 mh and 2.5 mh, and the inductance of inductive element 100 is 4 mh.

In certain slide-by mode applications, it is not sufficient to know when the first object to which target 22 is attached has passed by a predetermined point on a second object to which sensor 50 is attached. Such information is provided by the embodiment of sensor assembly 20 illustrated in FIG. 1. Instead, under certain circumstances, it is desirable to know if the first object is positioned anywhere along a path on the second object. In other words, under certain applications, a continuous output signal is desired whenever the first object is positioned anywhere along the prescribed path on the second object.

Figure 10:
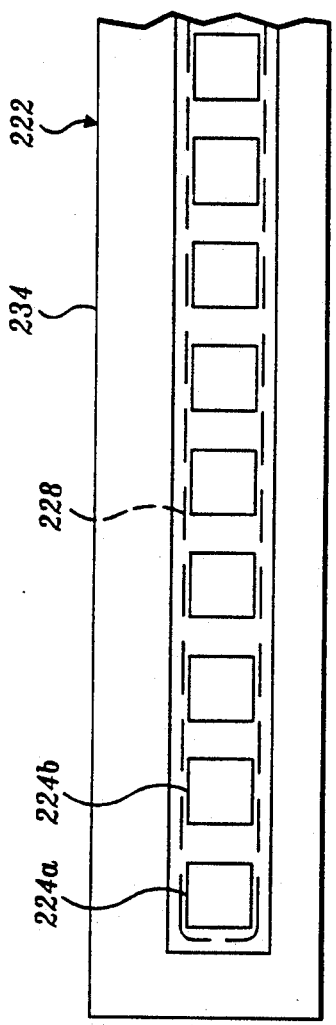
FIG. 10 is a top view of another embodiment of the target of the proximity sensor.

To achieve the above-described slide-by operation, target 222 illustrated in FIG. 10 is substituted for target 22. Target 222 is similar to target 22 except that it has an elongated configuration and a plurality of magnets 224 (i.e., 224a, 224b, etc.) are used in place of magnet 24. Alternatively, a single elongate magnet (not shown) may be used in place of magnets 224. Thus, base plate 228 is made from a high permeability material and has an elongate configuration. Container 234 is made from a nonmagnetic metal and is sized to receive elongate base plate 228 and the array of magnets 224 positioned thereon. An elongate version of cover 36 (not shown) is provided for engaging container 234 so as to enclose a space in which magnets 224 and base plate 228 are positioned.

Assuming target 222 is attached to a first object and sensor 50 is attached to a second object designed to move back and forth along an axis extending parallel to the long axis of target 222 such that sensor 50 will be intercepted by the magnetic fields provided by magnets 224, a point will be reached during the movement of the second object where magnet 224 enters the actuation zone of sensor 50. This event causes core 52 to saturate to the predetermined value, thereby causing the inductance of inductive element 60 to drop which in turn indicates the second object is within predetermined proximity of the first object. As the second object continues to move along the long axis of target 222, sensor 50 will pass out of the magnetic field of magnet 224a and into the magnetic field of magnet 224b. Preferably, the magnets 224 in target 222 are positioned sufficiently close to one another such that core 52 of sensor 50 remains saturated to the predetermined value as the sensor passes between adjacent magnets. Thus, as long as the second object is positioned relative to the first object such that core 52 of sensor 50 is saturated to the predetermined value by the magnetic field of at least one of the magnets 224 of target 222, the inductance of inductive element 60 remains low thereby indicating the relative proximity of the first and second objects.

Targets 22 and 222 have been described as including a housing made from a nonmagnetic metal. It is to be appreciated that when sensor assembly 20 (container 34 and cover 36) is designed to be used in an environment where stray currents from external sources will not be present, e.g., in an outer space environment, the housing is not required. In this case, base plate 28 or 228 may be attached directly to a first object.

An important advantage of the present invention is that its actuation range to weight ratio is about five times better than that of conventional variable reluctance proximity sensors. More specifically, proximity sensors having characteristics similar to those of the embodiment of the present invention described above in connection with the discussion of FIG. 5 and the high temperature stability of sensor assembly 20 have an actuation range on the order of 0.5" to at least 2". By contrast, known variable reluctance proximity sensors of similar weight to such embodiment of the present invention typically have an actuation range on the order of 0.1". Consequently, the present sensor has particular utility in environments where minimal weight is important, e.g., on aircraft or spacecraft. The high actuation range-to-weight ratio of the sensor of the present invention is achieved by the choice of materials used for magnet 24, the provision of plate 28, the choice of materials used for core 52, and the length-to-diameter ratio of sensor 50, all discussed above.

Another important advantage of the sensor assembly of the present invention is its high resistance to electromagnetic fields generated by a source external to the sensor assembly. Thus, the sensor may be advantageously used in environments subject to large electromagnetic fields, e.g., in aircraft subject to lightening strikes.

Yet another important advantage of the sensor assembly of the present invention is that its output signal is highly temperature stable. Typically, the output signal of the sensor assembly varies less than about 4% over the temperature range −60° C. to +120° C.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A saturable core proximity sensor comprising:
   a magnetic target that includes:
      a magnet having a front face and a back face that produces a magnetic field in front of, in back of, and to the sides of the magnet;
      a plate positioned adjacent the magnet for reducing the magnetic field in the back of and at the sides of the magnet and for increasing the distance at which the magnetic field extends in a direction perpendicular to the front face of the magnet;
   sensor means for detecting said magnetic field and for indicating when said sensor means is positioned within a predetermined proximity of said target means, said sensor means including;
      a core having a longitudinal axis that is aligned substantially perpendicular to the front face of the magnet, wherein said core has a cross-sectional area in a plane perpendicular to the longitudinal axis that is substantially smaller than a cross-sectional area of the core along the longitudinal axis so that the core magnetically saturates when exposed to magnetic fields of a predetermined flux density that extend along the longitudinal axis of the core but does not saturate when exposed to magnetic fields of the predetermined flux density that extend in a direction other than along the longitudinal axis of the core; and
      an inductive element surrounding said core, wherein the inductive element produces a second magnetic field that flows through the core and through an airgap that exists between the ends of the core, wherein said core and inductive element have an inductance that is less than a predetermined value when said core is saturated by the magnetic field produced by the magnet and an inductance that is greater than said predetermined value when said core is not saturated by the magnetic field produced by the magnet; and
   cancellation means associated with said magnetic target for canceling electromagnetic fields created by currents generated by a source external to said sensor such that said fields substantially do not intercept said magnetic target.

2. A sensor according to claim 1, wherein said magnet has a Curie temperature of at least about 250° C., and said plate has a relative permeability of at least about 20,000 and a flux saturation value of at least about 7,000 Gauss.

3. A sensor according to claim 2, wherein said magnet and plate are sized and positioned relative to one another so that said plate eliminates at least 90% of the reluctance path on one side of said plate.

4. A sensor according to claim 1, wherein said target means and said sensor means are designed so that said sensor means includes a ball-shaped actuation zone extending outwardly from one end of said sensor and centered about a central axis of said sensor, further wherein said magnetic field has a strength sufficient to cause at least a portion of said core to saturate to said predetermined value when at least a portion of said target means is positioned in said actuation zone.

5. A saturable core proximity sensor comprising:

a magnet for providing a magnetic field and a base plate made of a permeable material that is positioned adjacent the magnet, wherein said base plate substantially eliminates said magnetic field in back of and at the sides of said magnet and increases the magnetic field in front of said magnet; and sensor means for detecting said magnetic field, said sensor means including (a) a core having a longitudinal axis that is aligned substantially perpendicular to a front face of the magnet, wherein said core has a cross-sectional area perpendicular to the longitudinal axis that is substantially smaller than a cross-sectional area along the longitudinal axis so that the core magnetically saturates to a predetermined value by a component of said magnet field that extends parallel to the longitudinal axis of the core at a point during movement of said magnet toward said sensor means when said magnet is spaced a predetermined distance from said sensor means but is not saturated by a component of the magnetic field that extends in a direction other than parallel to the longitudinal axis of the core and (b) an inductor surrounding said core, wherein the inductive element produces a second magnetic field that flows through the core and through an airgap that exists between the ends of the core, wherein said magnet, said core and said inductor are designed so that the inductance of said inductor falls to a predetermined level when said magnet is spaced said predetermined distance from said sensor means.

6. A saturable core distance sensor comprising:

a target element for generating a magnetic field having X, Y, and Z direction components, wherein said X direction components have a maximum flux density adjacent a first axis, wherein the target element includes:

(a) a magnet for providing said magnetic field, said magnet having a planar surface, wherein said first axis extends perpendicular to said planar surface; and (b) a member made from a permeable material, said member being sized and positioned relative to said magnet, such that said member reduces the Y and Z directional components of the magnetic field and increases the X directional component of the magnetic field; and sensor means, including a core having a cross-sectional area that is substantially smaller in a direction perpendicular to a longitudinal axis of the core than a cross-sectional area along the longitudinal axis of the core, wherein the longitudinal axis of the core is aligned substantially parallel to the X directional component of the magnetic field so that the core magnetically saturates when exposed to a magnetic field having a predetermined flux density in the X direction and an inductive element surrounding said core that produces a second magnetic field that flows through the core and through an airgap that exists between the ends of the core and provides an output signal that varies linearly as a function of the distance between said target element and said sensor means.

7. A target for use with a sensor designed to provide an output signal when exposed to a magnetic field having a predetermined flux density, wherein said target comprises:

a magnet having a residual induction, $B_r$, of at least about 8,000 Gauss, a coercive force, $H_c$, of at least about 7,000 Oersteds, and a Curie temperature of at least about 250° C.;

a base plate made from a material having a relative permeability of at least about 20,000; and a housing sized to enclose said magnet and said base plate, wherein said housing is made from a material and is constructed so as to cancel electromagnetic fields generated by currents from sources external to said target and sensor such that said electromagnetic fields substantially do not intercept said target.

8. A target according to claim 7, wherein said housing is made from a nonmagnetic metal.

9. A target according to claim 7, wherein said housing is made from a material having a conductivity at least as great as the conductivity of aluminum.

10. A saturable core proximity sensor comprising:

a target element that includes a magnet for producing a magnetic field and a base plate that is made of a permeable material and is positioned behind the magnet, wherein said plate substantially eliminates the magnetic field in back of and at the sides of the magnet and increases the distance the magnetic field extends in front of the magnet; and a sensor comprising (a) a core having a cross-sectional area that is substantially smaller in a direction perpendicular to a longitudinal axis of the core than a cross-sectional area along the longitudinal axis of the core, wherein the longitudinal axis of the core is aligned substantially perpendicular to a front face of the magnet so that the core that will magnetically saturate to a predetermined value when said target element is positioned within a predetermined proximity of said core and (b) an inductor surrounding said core, wherein the inductive element produces a second magnetic field that flows through the core and through an airgap that exists between the ends of the core, wherein said target element, said inductor and said core are designed so that said inductor has an inductance that falls when the target element moves closer than a predetermined distance from the sensor.

11. A sensor according to claim 10, wherein said target means, said inductor and said core are designed so that the inductance of said inductor lies in a first range when said target means is positioned within said predetermined proximity of said sensor and lies within a second range when said target means is not positioned within said predetermined proximity of said sensor.

12. A proximity sensor comprising:

a target magnet that produces a magnetic field having X, Y, and Z directional components;

a field modification plate positioned adjacent the target magnet for increasing the distance at which the X directional component of the magnetic field extends in front of the magnet and for substantially eliminating the Y and Z directional components of the magnetic field produced by the target magnet;

an elongate core having a cross-sectional area that is substantially smaller in a direction perpendicular to a longitudinal axis of the core than a cross-sectional area along the longitudinal axis of the core;

an inductive element surrounding said elongate core, said inductive element producing a second magnetic field when coupled with a source that provides a predetermined drive current, wherein said second magnetic field flows through the core and through an airgap that exists between the ends of the elongate core, and an inductance that drops to a predetermined level when the elongate core is within a predetermined distance of the target magnet;

wherein the configuration of said core and the material from which said core is made are selected so that when said longitudinal axis of said elongate core extends parallel to the X directional component of the magnetic field and said elongate core is positioned within a predetermined proximity of the target magnet (a) said core will provide (i) a sufficiently high reluctance path to the Y and Z directional components of the magnetic field of the target magnet so as to substantially prevent the Y and Z components from entering said elongate core and (ii) a sufficiently low reluctance path to the X directional component of the magnetic field of the target magnet so that the X directional component will enter said elongate core and (b) said X directional component together with the second magnetic field produced by the inductive element will cause said elongate core to magnetically saturate to a predetermined value.

13. A sensor according to claim 12, wherein said configuration is selected so that said core has a length to maximum cross-section dimension of at least 5 to 1.

14. A sensor according to claim 12, wherein said material is selected so that said core has a relative permeability of at least 20,000.

15. A target for use with a sensor designed to provide an output signal when exposed to a magnetic field having a predetermined flux density, wherein said target comprises:

a magnet with a magnetic field having X, Y, and Z direction components, said X direction components of said magnetic field having a maximum flux density adjacent first and second portions of an axis intersecting said magnet, wherein said first portion extends in a first direction away from one side of said magnet and said second portion extends in an opposite direction away from an opposite side of said magnet, wherein said magnet has a residual induction, $B_r$, of at least about 8,000 Gauss and a coercive force, $H_c$, of at least about 7,000 Oersteds at $B_o$;

field modification means positionable adjacent said magnet for providing a least reluctance path adjacent said magnet so as to substantially eliminate that portion of said magnetic field adjacent said second portion of said axis and increase the distance that portion of said magnetic field adjacent said first portion of said axis extends from said magnet; and field cancellation means positionable adjacent said magnet and said field modification means for cancelling electromagnetic fields generated by currents from a source external to the sensor and said magnet such that said fields substantially do not intercept said magnet.

16. A target according to claim 15, wherein said magnet has a Curie temperature of at least about 250° C., further wherein said field modifying means includes a plate having a relative permeability of at least about 20,000 and a flux saturation value of at least about 7,000 Gauss.

17. A sensor according to claim 1, wherein said cancellation means comprises a housing made from a non-magnetic material, said housing designed to enclose said target means.

* * * * *